United States Patent [19]

Kosugi et al.

[11] Patent Number: 4,525,052
[45] Date of Patent: Jun. 25, 1985

[54] DEVICE FOR FIXING A CAMERA TO A TRIPOD

[75] Inventors: Yoshinobu Kosugi, Tokyo; Kaoru Tachibana, Kawagoe, both of Japan

[73] Assignee: Slik Tripod Co., Ltd., Japan

[21] Appl. No.: 564,681

[22] Filed: Dec. 23, 1983

[30] Foreign Application Priority Data

Jan. 27, 1983 [JP] Japan .............................. 58-10522[U]
Jan. 27, 1983 [JP] Japan .............................. 58-10523[U]

[51] Int. Cl.³ ...................... F16M 11/04; G03B 17/56
[52] U.S. Cl. ..................................... 354/293; 248/187
[58] Field of Search ................... 354/81, 82, 293, 295; 248/176, 177, 187

[56] References Cited

U.S. PATENT DOCUMENTS

| | | | |
|---|---|---|---|
| 2,824,504 | 2/1958 | Bethmann | 354/81 |
| 2,840,334 | 6/1958 | Cauthen | 248/187 |
| 3,423,056 | 1/1969 | Welt | 248/187 |
| 4,057,816 | 11/1977 | Killian et al. | 354/293 |

FOREIGN PATENT DOCUMENTS 52159230 5/1951 Japan .

Primary Examiner—John Gonzales
Attorney, Agent, or Firm—Robbins & Laramie

[57] ABSTRACT

A device for fixing a camera to a tripod which comprises a base and a slider to which a camera is to be fitted. Both base and slider are prepared from synthetic resin. The slider is slidably fitted on the base. One of the slider and base is provided with a projection, and the other thereof is provided with an integral elastically deformable piece. This deformable piece involves a protrusion engageable with the above-mentioned projection when the slider is set on the base, and a free end which allows for the elastic deformation to remove the slide from the base.

18 Claims, 11 Drawing Figures

DEVICE FOR FIXING A CAMERA TO A TRIPOD

BACKGROUND OF THE INVENTION

This invention relates to a device for fixing a camera to a tripod.

When photographing is carried out by attaching a camera to a tripod, the camera should be securely fixed to the universal head of the tripod. To this end, the universal head of the tripod is generally provided with a fitting screw which is free to protrude from the fitting surface of the universal head and be withdrawn therein. The bottom of the camera is provided with a screw hole allowing for the insertion of the fitting screw. The camera is securely placed on the universal head by threadedly inserting the fitting screw of the universal head into the screw hole of the camera bottom.

With the above-mentioned conventional method of fixing a camera to the universal head of the tripod, the fitting screw has to be turned, each time the camera is fitted to the universal head or removed therefrom. Therefore, the placement and release of a camera has hitherto undesirably consumed an appreciable length of time.

In view of the above-mentioned circumstances, a camera-fixing device has been proposed in the utility model publication No. 52-159,230 in order to facilitate the aforementioned placement and release of a camera. The proposed camera-fixing device comprises:

a base to be attached to the universal head;

a slider which is rendered connectable to the camera and placed on the base in slidable engagement therewith; and a camera-fixing mechanism received in the base, and wherein the camera-fixing mechanism is provided with a cam, which, when the slider is placed on the base, can press the slider against the base, and also with a lever which effects the fixing and releasing of the slider to the base by the rotation of the cam.

The known camera-fixing device constructed as described above can indeed quickly and reliably fix a camera to the base or the universal head simply by engaging the slider previously connected to the camera with the base and later rotating the lever. However, the conventional camera-fixing device has the drawbacks that the device requires the camera-fixing mechanism, and involves many parts, undesirably leading to the complicated arrangement and high cost of the camera-fixing device.

SUMMARY OF THE INVENTION

It is accordingly the object of this invention to provide a camera-fixing device of simple arrangement which enables a camera to be quickly fixed to a tripod, and involves fewer parts than required in the past, thereby reducing the cost.

To attain the above-mentioned object, this invention provides a device for fixing a camera to a universal head of a tripod, the device comprising:

a base which is attached to the upper end of the universal head and whose outer surface is provided with guiding sections; and a slider which is provided with guided parts slidably engaged with the guiding sections, and to the upper surface of which a camera can be connected, whereby the slider is slidably engaged with the base and detachably fitted on the base.

With a camera-fixing device according to a first aspect of this invention, the base further involves an integral engagement section. The slider is provided with an elastically deformable integral piece. The piece includes an integral engaged part, which, when the slider is fitted the base, is elastically engaged with the engagement section of the base, thereby assuring the secure mounting of the slider on the base. The elastically deformable piece can be bent by an external force applied to its free end. With the camera-fixing device of this invention, the slider connected to the camera is slidably engaged with the base, thereby simplifying the mounting of the camera on the universal head. When the slider is set at a prescribed position on the base, automatic interlock between the engaged part of the slider and the engaging section of the base allows for the secure mounting of the slider on the base, thereby allowing for the tight fitting of the camera to the universal head. The camera, together with the slider, can be taken off the base easily and quickly by bending the elastically deformable piece of the slider to release interlock between the engaging section and engaged part. The camera-fixing device which only comprises the base and slider can be manufactured at low cost due to a prominent decrease in the number of parts.

Meanwhile, according to a second aspect of the invention, the base involves an integral elastically deformable piece. This deformable piece can be elastically bent by an external force applied to its free end. The deformable piece has an integral engagement part. The slider is provided with an integral engaged section, which, when the slider is fitted to a prescribed position on the base, is elastically engaged with the engagement part of the base, allowing for the secure fitting of the slider on the base. Like the device of the first aspect, the camera-fixing device according to the second aspect of the invention offers the same advantages that the camera can be quickly and easily fitted to the universal head of a tripod and detached therefrom, and the manufacturing cost is reduced due to a prominent decrease in the number of parts.

DETAILED DESCRIPTION OF THE PREFERRED EMBODIMENTS

Figure 1:
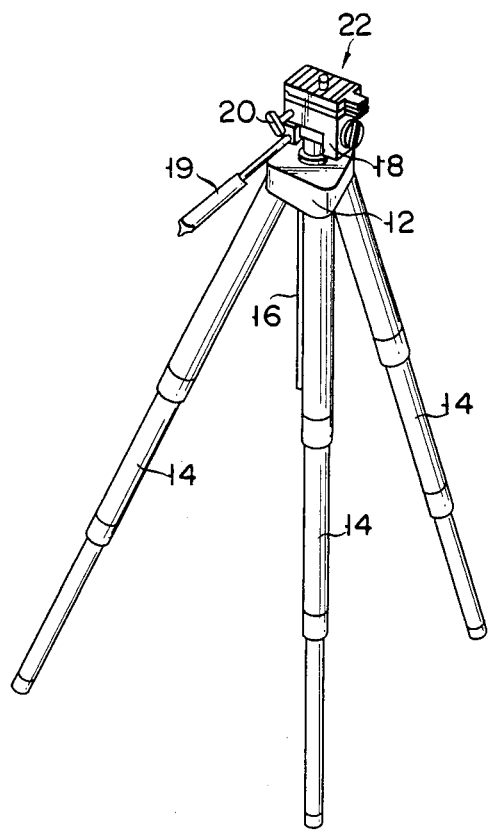
FIG. 1 is a perspective view of a tripod fitted with a camera-fixing device according to a first embodiment of this invention.

FIG. 1 shows a tripod fitted with a camera-fixing device according to a first embodiment of this invention. To describe briefly, the tripod is provided with a connection joint 12. The bottom of the connection joint 12 is fitted with the upper end portions of three telescopic legs 14 which can be spread out centering the upper end portions. The connection joint 12 is penetrated by a vertically movable support pipe 16. A universal head 18 is connected to the upper end of the support pipe 16. The universal head 18 can turn and tilting around the axis of the support pipe 16. The turn and tilting of the universal head 18 is effected by its pan lever 19 shown in FIG. 1.

Figure 2:
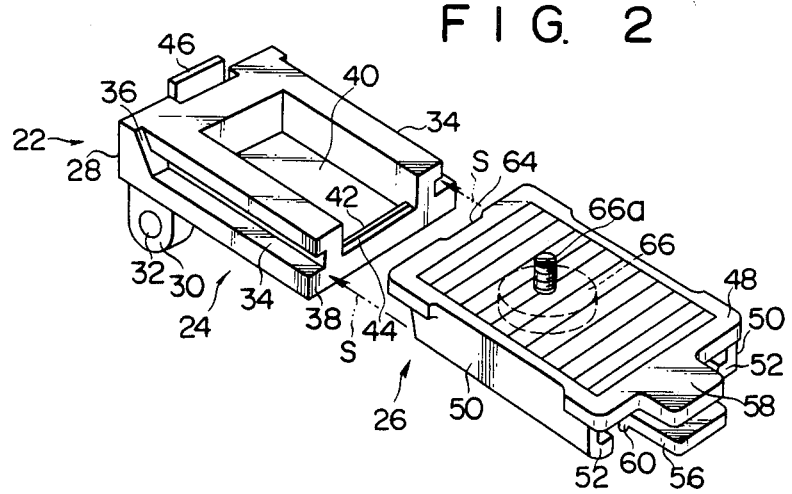
FIG. 2 is a perspective view of the camera-fixing device when the slider is taken off the base.

The universal head 18 is fitted with a camera-fixing device 22 according to a first embodiment of this invention. The camera-fixing device 22 comprises a base 24 and slider 26 (FIG. 2). The base 24 is molded from synthetic resin, for example, polyacetal. The slider 26 is molded from synthetic resin, for example, polyamide which is smaller than the polyacetal in hardness. The base 24 has a plate-shaped rectangular base body 28. A pair of downward projecting brackets 30 are integrally formed at an end of the bottom of the base body 28. The paired brackets 30 are respectively provided with a penetrating hole 32. The hole 32 is penetrated by the shaft of a locking knob 20 shown in FIG. 1, thereby enabling the base 24 to be rotated around the locking knob shaft when the locking knob is loosen. A pair of guide grooves 34 are provided along both lateral sides of the rectangular base body 28. The guide groove 34 is provided with an inclined end surface 36 on one side and is open to the other end 38 of the base body 28 on the opposite side. Both lateral edges of the base body 28 are notched along the paired parallel guide grooves 34. A rectangular cavity 40 is formed in the upper surface of the base body 28 in a state open to the other end 38 thereof. A projection 42 is integrally formed all along that bottom edge of the cavity 40 which extends along the other end 38 of the base body 28. That side of the projection 42 which faces the other end 38 of the base body 28 has a downward inclined plane 44. That side of the base body 28 on which the inclined end surface 36 is formed is notched at the center. A thin stopper wall 46 integral with the base body 28 is built in the notch. This stopper wall 46 can be elastically deformed, starting with its base. The stopper wall 46 rises above the base body 28.

The rectangular slider 26 has a slide body 48 made tinnner than the base body 28 of the base 24. A pair of parallel walls 50 extend along both lengthwise sides of the slide body 48. The lower end portions of the parallel lateral walls 50 are respectively bent inward, to act as a guided ridge 52. The guided ridge 52 is made slidable through the guide groove 34 in the direction of an arrow S indicated in FIG. 2. Therefore, the slider 26 is slidably fitted to the upper surface of the base 24. When the slider 26 is mounted on the base 24, both lateral walls 50 of the slider 26 are exactly contact with the corresponding walls of the base 24, thereby suppressing the chattering of the slider 26 which might otherwise occur against the base 24. Both lateral walls 50 of the slider 26 are inclined at one end in conformity to the inclined end surface 36 of the guide groove 34 of the base 24.

Figure 3:
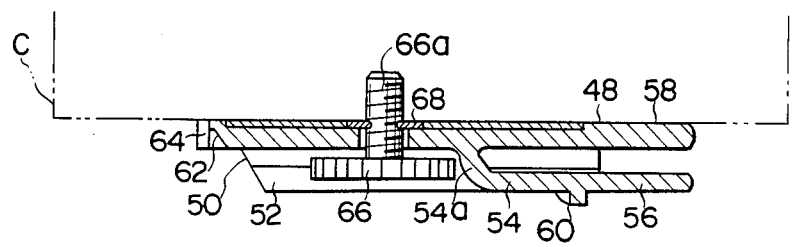
FIG. 3 is a cross sectional view of the slider of FIG. 2.
Figure 4:
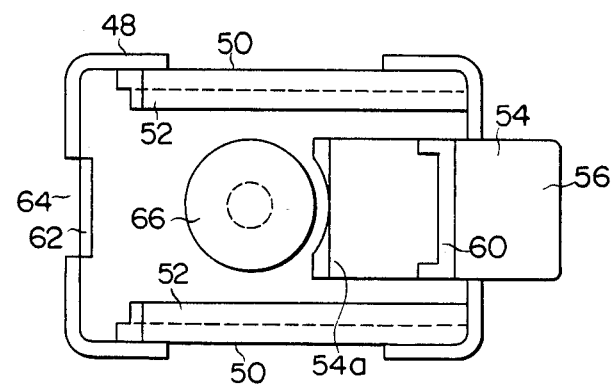
FIG. 4 is a bottom view of the slider of FIG. 2.

As seen from FIG. 3, a thin plate-shaped elastically deformable piece 54 is provided to the underside of the slide body 48, in the state in which one end of the piece 54 is integrally connected to the substantially central portion of the underside. The elastically deformable piece 54 is interposed between both lateral walls 50 of the slide body 48 at a prescribed space from the slide body 48, and extends in parallel therewith in a direction opposite to the sliding direction S to protrude outward from both lateral walls 50 (FIG. 4). The other end of the elastically deformable piece 54 constitutes a free end 56. The slide body 48 has an integral protruding section 58 (FIG. 2) extending with the same length and in the same direction as the elastically deformable piece 54. The elastically deformable piece 54 is lifted by the user's forefinger touching the free end 56 thereof, then the piece 54 is elastically bent with its proximal end 54a taken as a fulcrum. An integral downward extending engaged projection 60 is formed at a prescribed spot on the underside of the piece 54. When the slider 26 is set on the base 24 by slidable engagement therewith, the engaged projection 60 goes beyond the projection 42 of the base 24 to be engaged therewith. With the camera-fixing device according to the first embodiment of this invention, the notch 64 is formed in part of one front end face of the slide body 48 as viewed from its sliding direction S. At the time of the engagement, the inclined plane 62 of the notched portion 64 of the slider 26 is elastically abuts against the stopper wall 46 of the base 24.

The slide body 48 is provided with a camera-fixing bolt 66 threadedly engageable with a tripod socket previously formed in the bottom of a camera. The threaded portion 66a of the bolt 66 can project above that surface of the slider body 48 to which the camera is fitted. A ring 68 is engaged with the threaded portion 66a to prevent the separating of the bolt 66. The upper surface of the slide body 48 is coated with a sheet 70 prepared from, for example, rubber in order to assure the tight fitting of the camera.

Description may now be made of the function of a camera-fixing device according to a first embodiment of this invention which consists of the above-mentioned base 24 and slider 26. Now let it be assumed that the base 24 is previously fitted to the universal head 18 of a tripod, and the slider 26 is taken off the base 24 as shown in FIG. 2. In the case of FIG. 2, the camera is fixed to the upper side of the slider 26 by means of the bolt 66. Referring to FIG. 3, the camera is represented by an imaginary line C.

The slider 26 to which the camera C has been fitted is engaged with the base 24 by sliding in the direction S indicated in FIG. 2 to be securely set on the base 24. When the slider 26 is set on the base 24, the elastically deformable piece 54 is bent upward to cause the engaged projection 60 to go beyond the projection 42 of the base 24, and then regains its original position by a downward elastic return to effect engagement between the projections 60, 42. At this time, the inclined plane 62 of the notch 64 is elastically pressed against the stopper wall 46 of the base 24. As a result, the slider 26 automatically clamped between the stopper wall 46 of the base 24 and the projection 42 is securely set on the base 24 without chatteringly moving in the sliding direction S.

Figure 5:
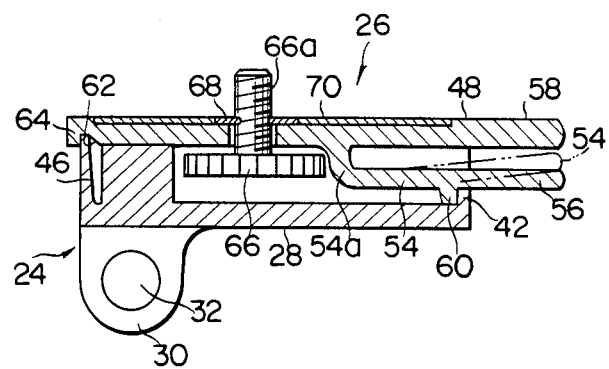
FIG. 5 cross sectional view of the camera-fixing device when the slider is securely mounted on the base.
Figure 6:
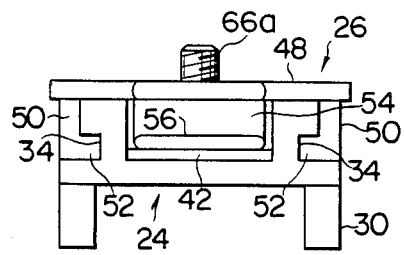
FIG. 6 is a lateral view of the camera-fixing device of FIG. 5.

When the camera-supporting slider 26 now securely set on the base 24 is taken off, the steps for removing the slider 26 from the base 24 are as follows. First, the camera C and the free end 56 of the elastically deformable piece 54 are gripped by the thumb and forefinger, thereby causing the piece 54 to be elastically bent upward as indicated by imaginary lines given in FIG. 5. Therefore, the projection 60 of the piece 54 is disengaged from the projection 42 of the base 24. Later, the slider 26 is made to move away from the base 24 in a direction opposite to the sliding direction S. As a result, the slider 26, together with the camera, is taken off the base 24.

The above-mentioned camera-fixing device according to the first embodiment of this invention offers the advantages that the camera C can be automatically fixed by causing the slider 26 previously fitted with the camera C to be slidably engaged with the base 24, and conversely can be easily removed from the base 24 together with the slider 26; and the subject device which involves only two parts, namely, the base 24 and slider 26 and wherein the base 24 and slider 26 are integrally molded from synthetic resins assures reduction in the weight and cost.

It will be noted that this invention is not limited to the above-mentioned first embodiment. Description may further be made of the second and third embodiments of the invention. The parts of the second and third embodiments the same as those of the first embodiment and the sections of the second and third embodiments performing the same function as those of the first embodiment are denoted by the same numerals description thereof being omitted.

Figure 7:
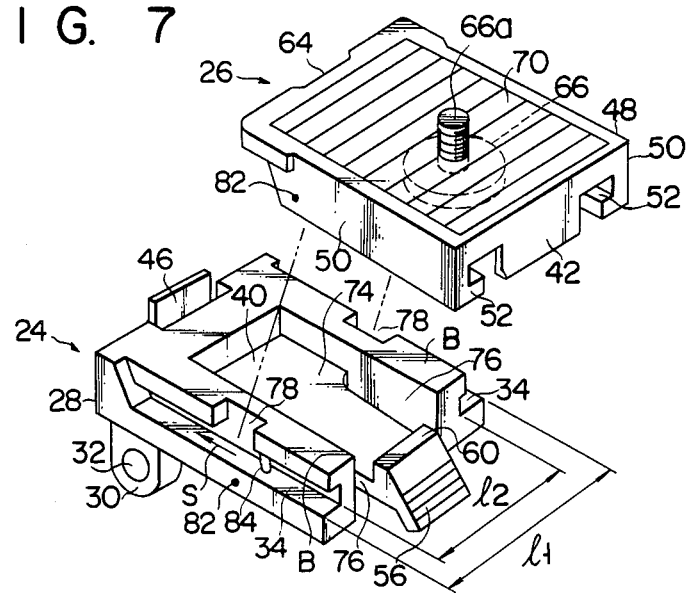
FIG. 7 is a perspective view of the camera-fixing device according to the second embodiment of the invention, when the slider is taken off the base.
Figure 8:
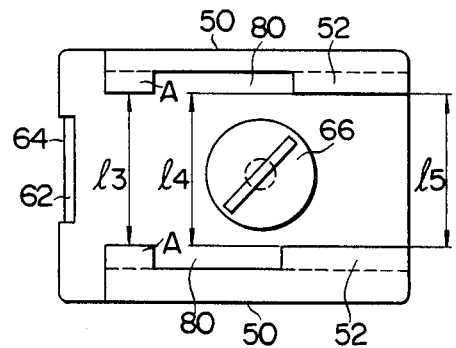
FIG. 8 is a bottom view of the slider of FIG. 7.
Figure 9:
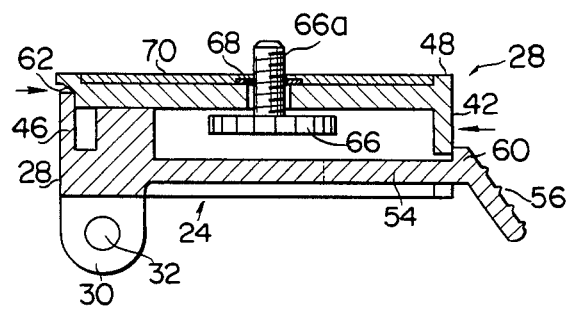
FIG. 9 is a cross sectional view of the camera-fixing device according to the second embodiment of the invention when the slider is securely mounted on the base.

Description may now be made with reference to FIGS. 7 to 9 of a camera-fixing device according to the second embodiment of this invention. The base body 28 of this second embodiment involves an integral elastically deformable piece 74 having the same function as the piece 54 of the first embodiment. The slider 26 is provided with an integral projection 42 engageable with the engaged projection 60 of the elastically deformable piece 74. It is to be noted that notches 76 defined between the inner lateral walls of the cavity 40 and the lateral sides of the elastically deformable piece 74 helps to be able to reduce the width l1 of that end portion of the base body 28 which is remote from the stopper wall 46. The guide grooves 34 extending along both lateral sides of the base body 28 are chosen to have a width l2. A pair of notches 78 communicating with the paired guide grooves 34 are provided substantially at the center of the surface of both lateral walls of the base body 28.

Referring to the slider 26, notches 80 (FIG. 8) are formed at the center of both ridges 52 of the slide body 48. The aforementioned notches 78 enable one of the unnotched front portions A of the ridges 52 of the slide body 48 to go through the corresponding notch 78 of the base 24, and the notches 80 of the slider 26 enable one of that portions B of the lateral edges of the base 24 which lies behind the notch 78 in the sliding direction S to go through the corresponding notch 80 of the slider 26. In the case of the second embodiment, therefore, the slider 26 can be fitted into the base 24 from above, thereby making it possible to reduce the distance through which the slider 26 is demanded to slide. A locating mark 82 is impressed on both base 24 and slider 26 to facilitate the fitting of the slider 26 into the base 24 from above. The guide grooves 34 of the base 24 are respectively provided with a stopper 84, which, after the fitting of the slider 26 into the base 24 from above, prevents the slider 26 to be moved backward in a direction opposite to its sliding direction S.

Now referring to a distance between the paired ridges 52 of the slider 26, a distance l3 between the portions A of the ridges 52 and a distance l4 indicated in FIG. 8 are made equal to the width l2 of the guide groove 34 of the base 24. A distance l5 (FIG. 8) defined between the paired ridges 52 of the slider 26 is chosen to be a little shorter than the distance l4.

In the case of the second embodiment, therefore, the larger the extent to which the slider 26 is fitted into the base 24 in the sliding direction S, the greater the force with which the ridges 52 of the slider 26 are elastically fitted into the guide grooves 34 of the base 24. As a result, the slider 26 is securely fitted into the base 24. Obviously, the second embodiment constructed as described above, assures the same function and effect as the first embodiment.

Figure 10:
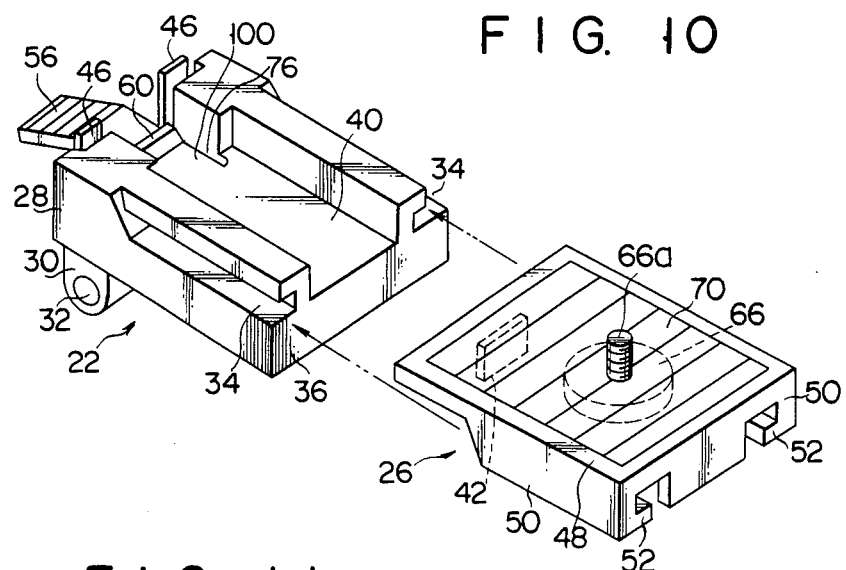
FIG. 10 is a perspective view of a camera-fixing device according to a third embodiment of this invention when the slider is taken off the base.
Figure 11:
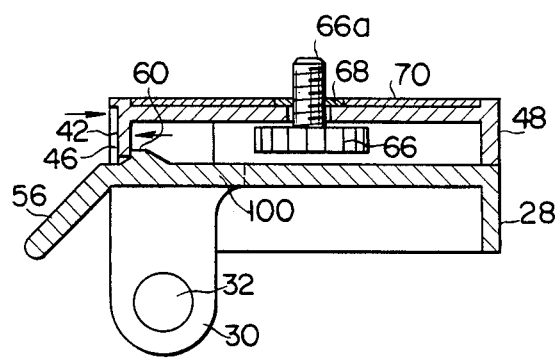
FIG. 11 is a cross sectional view of the camera-fixing device according to the third embodiment of the invention when the slider is securely mounted on the base.

Description may now be made with reference to FIGS. 10 and 11 of a camera-fixing device according to a third embodiment of this invention. The base body 28 of the third embodiment is provided with a pair of stopper walls 46. An elastically deformable piece 100 is provided close to the paired stopper walls 46. An integral projection 42 is provided at the forward end of the slide base 48 as viewed from the sliding direction S of the slider 26. Obviously, the third embodiment constructed as described above assures the same function and effect as the first and second embodiments.

It will be noted that this invention is not limited to the aforementioned first, second and third embodiments. Throughout these embodiments, the base 24 and slider 26 were integrally molded from synthetic resins. As need arises, however, the base 24 and slider 26 may be integrally formed of the metals. The device embodying this invention is chiefly applied in the fixing of a camera, but is applicable to the case where a flash gun is fixed to a tripod.

What is claimed is:

1. A device for fixing a camera to a universal head of a tripod which comprises:
    a base which is adapted to be attached on the upper end portion of the universal head, said base having in its surface guiding sections and an engagement portion; and
    a slider to which a camera is to be fitted, and which includes;
        a slide body,
        integral guided sections which are formed on the surface of the slide body to be slidably engaged with the guiding sections, whereby said slider can be slidably mounted on said base in a detachable condition, and
        an elastically deformable piece integrally formed with the slide body, the piece having an integral engaged portion and a free end, the integral engaged portion being elastically engaged with the engaging portion of said base when said slider is set on said base and the free end serving to cause the piece to be elastically deformed by an external force, whereby said slider is securely fixed on said base by the interlock between the engaging portion and the engaged portion, and said slider is removed from said base after the interlock is released by the forced deformation of the piece which occurs by an external force applied to the free end of the piece.

2. The device according to claim 1, wherein said base is prepared from first synthetic resin and said slider is prepared from second synthetic resin which is smaller than the first synthetic resin in hardness.

3. The device according to claim 1, wherein said base includes means for pivotally mounting the base to the universal head.

4. The device according to claim 1, wherein said base has a pair of substantially parallel side faces; the guiding sections of said base are of a pair of parallel extending grooves which are formed in the side faces of said base; the slide body has a pair of substantially parallel side walls which are apart from each other; and the guided sections of said slider are of a pair of parallel extending ridges, which are formed in the facing surface of the side walls, slidably engageable with the grooves.

5. The device according to claim 4, wherein said base involves a stopper portion which is elastically pressed against part of said slider when said slider is set on said base.

6. The device according to claim 4, wherein the engagement portion of said base is a projection formed on said base; the engaged portion of said elastically deformable piece is a protrusion which goes beyond the projection of said base to be engaged therewith when said slider is set on said base.

7. The device according to claim 1, wherein said slider is provided with a bolt for securely fitting the camera.

8. A device for fixing a camera to a universal head of a tripod which comprises:
a base which is adapted to be attached on the upper end portion of the universal head and includes;
  a base body,
  guiding sections formed on the outer wall of the base body, and
  an elastically deformable piece integrally formed with the base body, the piece having an engaging portion and a free end serving to elastically deform the piece by an external force; and
a slider to which a camera is fitted, and which includes;
  guided sections slidably engageable with the guiding sections of said base, whereby said slider being detachably set on said base due to the slidable engagement therewith, and
  an engaged portion which is elastically engaged with the engaging portion of the piece when said slider is set on said base, whereby said slider is securely fixed on said base by the interlock between the engaging portion and the engaged portion, and said slider is removed from said base after the interlock is released by the forced deformation of the piece which occurs by an external force applied to the free end of the piece.

9. The device according to claim 8, wherein said base includes means for pivotally mounting the base to the universal head.

10. The device according to claim 8, wherein the base body has a pair of substantially parallel side faces; the guiding sections of said base are of a pair of parallel extending grooves which are formed in side face of the base body; and said slider has a pair of substantially parallel side walls which are of apart from each other and the guided sections of said slider are a pair of parallel extending ridges, which are formed in the facing surface of the side walls, slidably engageable with the grooves.

11. The device according to claim 10, wherein said base is provided with a stopper portion which is elastically pressed against part of said slider when said slider is set on said base.

12. The device according to claim 10, wherein the engaging portion of the elastically deformable piece is a projection formed on the piece; and the engaged portion of said slider is a protrusion which goes beyond the projection of the piece to be engaged therewith when said slider is set on said base.

13. The device according to claim 8, wherein said slider is provided with a bolt for securely fitting the camera.

14. The device according to claim 10, wherein the paired grooves of the base body extend substantially in parallel; the base body is elastically deformable to reduce a distance between the certain bottom faces of the paired grooves; and a distance between the pair of ridges of said slider progressively decreases in the direction opposite to the sliding direction of said slider when it is slidably set on said base.

15. The device according to claim 14, wherein the paired ridges of said slider are notched at the center portion, and the base body is provided with notches communicable with said grooves, thereby causing both ridges of said slider to be fitted into said grooves from above.

16. The device according to claim 11, wherein the elastically deformable piece of said base is set on the rear side as viewed from the sliding direction of said slider when it is fixed on the surface of said base.

17. The device according to claim 11, wherein the elastically deformable piece of said base is set on the front side as viewed from the sliding direction of said slider when it is mounted on the surface of said base.

18. The device according to claim 8, wherein said base is prepared from first synthetic resin and said slider is prepared from second synthetic resin which is smaller than the first synthetic resin in hardness.

* * * * *